(12) United States Patent
Sheaffer et al.

(10) Patent No.: US 9,350,909 B2
(45) Date of Patent: May 24, 2016

(54) REMOTELY CONTROLLED CROWD-SOURCED MEDIA CAPTURE

(71) Applicant: Empire Technology Development LLC, Wilmington, DE (US)

(72) Inventors: Gad S. Sheaffer, Haifa (IL); Shmuel Ur, Galil (IL); David Hirshberg, Haifa (IL); Yesha Sivan, Ramat HaSharaon (IL); Menahem Kaplan, Tel Aviv-Yafo (IL)

(73) Assignee: Empire Technology Development LLC, Wilmington, DE (US)

( * ) Notice: Subject to any disclaimer, the term of this patent is extended or adjusted under 35 U.S.C. 154(b) by 48 days.

(21) Appl. No.: 13/978,850

(22) PCT Filed: Feb. 1, 2013

(86) PCT No.: PCT/US2013/024508
§ 371 (c)(1),
(2) Date: Jul. 9, 2013

(87) PCT Pub. No.: WO2014/120244
PCT Pub. Date: Aug. 7, 2014

(65) Prior Publication Data
US 2014/0218549 A1    Aug. 7, 2014

(51) Int. Cl.
*H04N 5/232* (2006.01)
*G06F 3/00* (2006.01)

(52) U.S. Cl.
CPC ............ *H04N 5/23203* (2013.01); *G06F 3/005* (2013.01); *H04N 5/23296* (2013.01)

(58) Field of Classification Search
CPC ........................................................ H04N 5/232
USPC ........................................ 348/211.99–211.14
See application file for complete search history.

(56) References Cited

U.S. PATENT DOCUMENTS

| 5,801,771 | A  | * | 9/1998 | Ohwaki et al. ............. 348/211.7 |
| 6,222,538 | B1 |   | 4/2001 | Anderson |
| 6,326,901 | B1 |   | 12/2001 | Gonzales |
| 6,670,984 | B1 | * | 12/2003 | Tanaka et al. ................. 348/159 |
| 6,754,373 | B1 |   | 6/2004 | de Cuetos et al. |

(Continued)

FOREIGN PATENT DOCUMENTS

EP    1361713   A1    11/2003

OTHER PUBLICATIONS

International Search Report from International Application No. PCT/US13/24508 mailed Apr. 29, 2013.

(Continued)

*Primary Examiner* — Anthony J Daniels
(74) *Attorney, Agent, or Firm* — Brundidge & Stanger, P.C.

(57) ABSTRACT

The disclosed technology receives at a second computing device a message from a first computing device comprising at least an indication of a physical motion, a requested motion, or an indication of a camera control operation. The indicated motion can correspond to a physical motion made to the first computing device. The indicated camera control operation can correspond to a camera control operation made at the first computing device. The technology requests to physically move the second computing device if the received message indicates a motion; and controls a digital camera associated with the second computing device if the received message indicates a camera control operation made at the first computing device.

29 Claims, 11 Drawing Sheets

(56) References Cited

U.S. PATENT DOCUMENTS

| | | | |
|---|---|---|---|
| 7,154,538 B1* | 12/2006 | Fukasawa et al. | 348/211.3 |
| 2002/0122113 A1 | 9/2002 | Foote | |
| 2003/0165192 A1* | 9/2003 | Kitta | 375/240.01 |
| 2005/0206720 A1 | 9/2005 | Cheatle et al. | |
| 2010/0046842 A1 | 2/2010 | Conwell | |
| 2010/0304731 A1* | 12/2010 | Bratton et al. | 455/420 |
| 2011/0211087 A1* | 9/2011 | Mate et al. | 348/222.1 |
| 2012/0127319 A1* | 5/2012 | Rao et al. | 348/169 |
| 2012/0329558 A1 | 12/2012 | Haigh-Hutchinson | |

OTHER PUBLICATIONS

"YouTube Launches Reporters' Center to Foster Citizen Journalism" by S. Myers, 2009, 2 pgs.

"Remote Viewfinder for SH100" Samsung Electronics Co., Ltd., 2012, 2 pages.

"Citizen journalism," Retrieved from URL: https://web.archive.org/web/20130131034058/http://en.wikipedia.org/wiki/Citizen_journalism, on Dec. 8, 2014, last modified on Jan. 29, 2013, pp. 9.

\* cited by examiner

REMOTELY CONTROLLED CROWD-SOURCED MEDIA CAPTURE

CROSS-REFERENCE TO RELATED APPLICATIONS

The present application is a U.S. national phase application under 35 U.S.C. §371 of International Application No. PCT/US13/24508, filed on Feb. 1, 2013.

BACKGROUND

People sometimes desire to watch or hear what is going on at remote locations. For example, television has a long history of enabling viewers to see events occurring virtually anywhere in the world, even as the events occur live. To broadcast events, television broadcasters may deploy television crews with television cameras, reporters, and technical staff. Television crews can include multiple camera operators and cameras, e.g., to capture events from different viewpoints or "angles." Deploying television crews, however, is an expensive and time-consuming proposition because of the size of equipment and manpower that is required. Moreover, television broadcasters may be unable to deploy television crews until after a newsworthy event has already completed because of the time required to organize the equipment, manpower, and travel itinerary.

Mobile computing devices, e.g., mobile telephones, tablet computers, and other handheld computing devices, typically have video and audio capture devices, e.g., cameras, microphones, etc. These types of mobile computing devices are now in use almost everywhere around the world, and are becoming ubiquitous. Some of these mobile computing devices have video and audio capture devices that rival professional broadcast equipment used by television crews. Recently, mobile telephones have included video capture devices that produce high definition video. It is anticipated that future mobile computing devices will be able to produce even better quality audio and video suitable for broadcast television.

Although users of mobile computing devices capture photographs, video, and/or audio, e.g., to share this media with others, it is generally not possible for people to capture media under direction of unknown parties. For example, although a user may be nearby a location where a newsworthy event is occurring, the user may be unaware of the newsworthy event, e.g., because the user is down the street or around the block. As another example, although a user may be watching a newsworthy event and even capturing media, a remote viewer may desire to see a different angle or a different subject.

SUMMARY

In some embodiments, the disclosed technology receives at a second computing device a message from a first computing device, the message comprising at least an indication of a physical motion or a requested motion, or an indication of a camera control operation. The indicated motion can correspond to a physical motion made to the first computing device and the indicated camera control operation can correspond to a camera control operation made at the first computing device. The technology then requests a user of the second computing device to physically move the second computing device if the received message indicates a motion and controls a digital camera associated with the second computing device if the received message indicates a camera control operation made at the first computing device.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
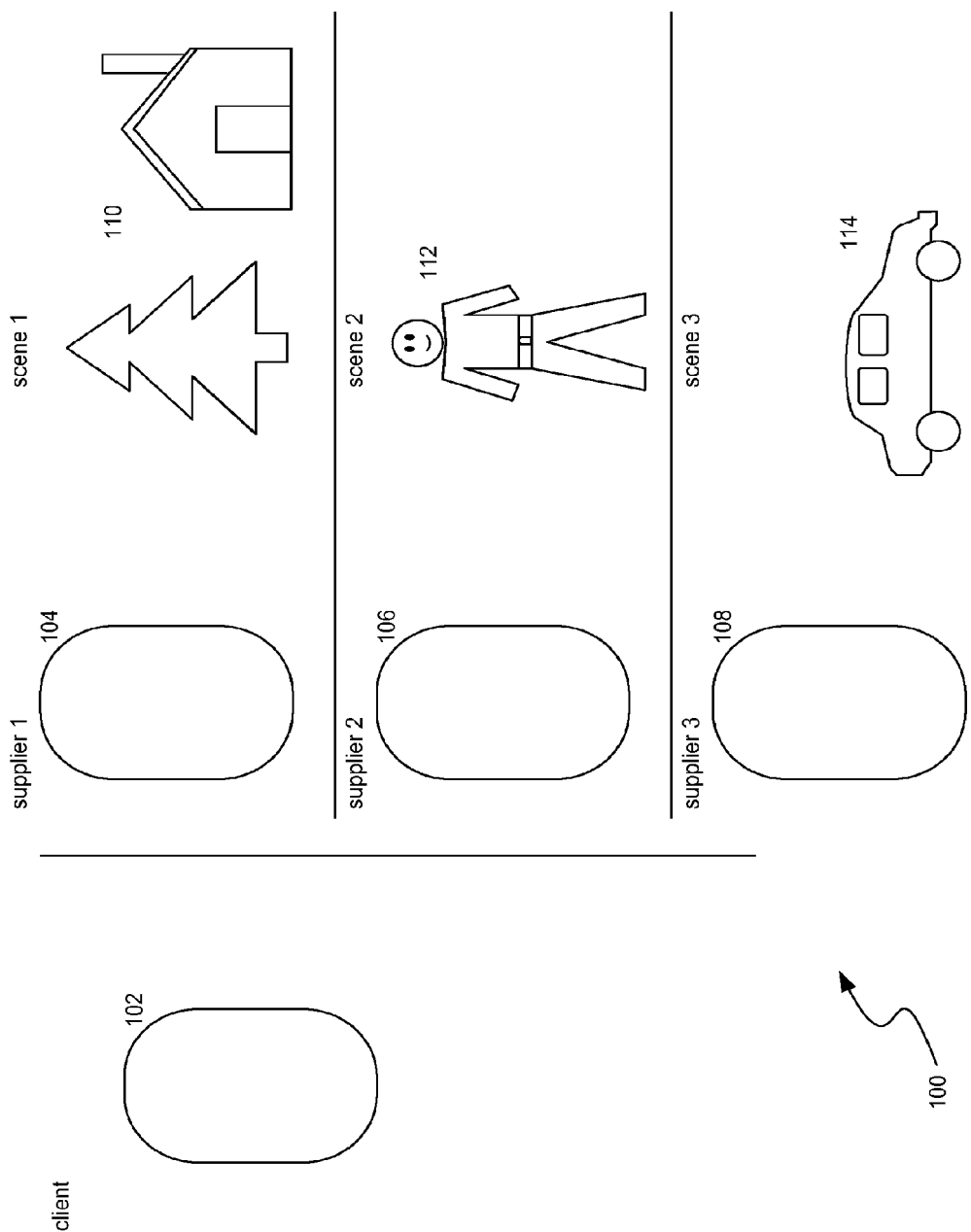
FIG. 1 is a block diagram illustrating an environment in which the disclosed technology may operate in various embodiments.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Technology is described for remotely controlling crowd-sourced media capture ("the technology"). In various embodiments, a client (e.g., a user of a local computing device) interacts with one or more suppliers (e.g., users of remote computing devices) via the local computing device to manipulate the remote computing devices to capture media the client is interested in. The client can identify one or more suppliers who are nearby a particular geographical location and whose mobile computing devices are capable of providing the type and/or quality of media the client desires, and then "control" the suppliers' mobile computing devices by manipulating the client's computing device. As one example, the client can pan the client's mobile computing device (e.g., move it left or right), rotate it, tilt it, etc., which actions are transmitted to a supplier's mobile computing device. Alternatively, the client can use user interface elements (e.g., arrows, buttons, voice control, touch-screens, joysticks, trackballs, etc.) to indicate motion. The client's computing device may be capable of detecting the physical motion and/or the motion indicated by using user interface elements. The supplier's computing device then provides an indication of the direction of motion, e.g., visually, audibly, and/or tactilely. The supplier can then move the supplier's mobile computing device accordingly. When the movement is to be stopped, the supplier's computing device can then provide an indication to stop the motion, e.g., again using visual, audible, and/or tactile cues. As another example, the client can zoom a camera in or out, turn a microphone on or off, etc., and the client's computing device can transmit indications of these actions to the supplier's computing device. The supplier's computing device may be capable of taking parallel actions without requiring further input from the supplier.

Thus, a news organization can take advantage of remote "eyes" and "ears" of many people concurrently without deploying expensive and time-consuming crews to assemble broadcast feeds in a way that "crowd-sourced news" may be lacking because of lack of centralized coordination. One skilled in the art will recognize that the technology can be adapted for other uses, e.g., emergency or other government and commercial services. For example, legislation may oblige mobile phone service providers to contact users, e.g., in the event of an emergency.

In various embodiments, the technology enables clients' computing devices and suppliers' computing devices to negotiate capabilities, tariffs or charges, etc. Clients and suppliers can register their computing devices with one or more server computing devices. The server computing devices can track positions of suppliers, capabilities of suppliers, etc. When a client desires media (e.g., a data feed or media streaming) from a particular location, the client's computing device can transmit a request indicating the location to a server computing device. The server computing device can identify supplier computing devices that are presently nearby the indicated location, and can facilitate connection, e.g., by indicating technical capabilities and/or coordinating tariffs. Examples of technical capabilities include, e.g., media encoders or decoders ("codecs"), bandwidth, video capture resolution, etc. After the server facilitates connections between client computing devices and supplier computing devices, supplier computing devices can provide data feeds to the client computing devices and the client can transmit requests to suppliers, e.g., to move the supplier computing devices.

In various embodiments, the technology provides a method performed by a computing device, comprising: detecting, by a client component operating at a first computing device, at least one of a physical motion made to the first computing device or a camera control operation relating to a first digital camera associated with the first computing device; creating a message to send to a second computing device; in response to a determination that a physical motion is detected at the first computing device, modifying the created message by adding an indication of the detected motion; in response to a determination that a camera control operation is detected at the first computing device, modifying the created message by adding an indication of the detected camera control operation; and transmitting the modified message to the second computing device to cause the second computing device either to perform the camera control operation relating to a second digital camera associated with the second computing device or to provide an indication to move the second computing device in a manner consistent with the physical motion detected at the first computing device. The indication to move the second computing device can be provided to a user of the second computing device. Detecting the camera control operation can include detecting a zoom operation. Transmitting the modified message may cause the second digital camera to perform an equivalent zooming operation. Detecting the camera control operation can include detecting that a video capture mode is enabled. The method may further comprise detecting at the first computing device an operation of a first microphone associated with the first computing device; modifying the created message by adding an indication of the operation of the first microphone; and causing the second computing device to operate a second microphone associated with the second computing device in a manner consistent with the operation of the first microphone. The operation of the first microphone can be to turn the microphone on or to turn the microphone off. The method may comprise detecting the physical motion using a sensor associated with the first computing device. The method may invoke a function of an application programming interface that provides motion information detected using an accelerometer. The method may transmit the modified message, which causes the second computing device to generate an alert using visual, audible, and/or sensory cues to move the second computing device. The method may further comprise receiving from the second computing device an indication of an appropriate audio codec or a video codec, and selecting at the first computing device one or more codecs corresponding to the indicated audio codec or video codec. The method may detect the physical motion made to the first computing device includes detecting a rotation or a tilt. The method may receive an audio stream and/or a video stream from the second computing device. The method may relay the received audio stream and/or video stream to a third computing device.

In various embodiments, the technology provides a method performed by a computing device, comprising: receiving at a second computing a message from a first computing device, the message comprising at least an indication of a physical motion or an indication of a camera control operation, the indicated motion corresponding to a physical motion made to the first computing device, the indicated camera control operation corresponding to a camera control operation made at the first computing device; requesting to physically move the second computing device in response to a determination that the received message indicates a physical motion made to the first computing device; and controlling a digital camera associated with the second computing device in response to a determination that the received message indicates a camera control operation made at the first computing device. The request may be made visually, audibly, or tactilely. The request may be made to a user of the second computing device. The method may transmit from the second computing device a message to the first computing device indicating an audio codec and/or a video codec operating at the second computing device. The method may receive an indication of an audio codec and/or video codec operating at the first computing device that is different from the audio codec and/or a video codec operating at the second computing device. The method may select at the second computing device the different audio codec and/or a video codec operating at the first computing device. The method may invoke a function of an application programming interface that enables a digital camera associated with the second computing device to be controlled. The method may invoke a function of an application programming interface that enables a microphone associated with the second computing device to be controlled. The method may transmit location information indicating a geographic location of the second computing device. The method may transmit to the first computing device an audio stream using a microphone associated with the second computing device and/or a video stream captured using a digital camera associated with the second computing device.

In various embodiments, the technology provides a system, comprising: a first computing device having one or more processors and memories; a sensor configured to detect movement of the first computing device; a component configured to employ the sensor to detect at least one of a physical motion made to the first computing device or a camera control operation relating to a first digital camera associated with the first computing device; and a component configured to create a message to send to a second computing device, modify the created message by adding an indication of the detected motion in response to a determination that a physical motion is detected at the first computing device, modify the created message by adding an indication of the detected camera control operation in response to a determination that a camera control operation is detected at the first computing device, and transmit the modified message to the second computing device to cause the second computing device either to perform the camera control operation relating to a second digital camera associated with the second computing device or to indicate to move the second computing device in a manner consistent with the physical motion detected at the first computing device. The indication to move the second computing device can be made visually, audibly, or tactilely. The indication can be made to a user of the second computing device. The sensor may be an accelerometer. The sensor may detect a panning motion. The sensor may detect a tilting motion.

In various embodiments, the technology provides a system, comprising: a second computing device having one or more processors and memories; a component configured to receive a message from a first computing device, the message indicating a motion detected at the first computing device and/or a camera control operation detected at the first computing device; and a component configured to take an action at the second computing device based on the received message. The system may comprise a component configured to provide a visual cue to a user of the second computing device to move the second computing device according to the motion indicated at the first computing device, or to stop moving the second computing device. The system may comprise a component configured to provide an audible cue to a user of the second computing device to move the second computing device according to the motion indicated at the first computing device, or to stop moving the second computing device. The system may comprise a component configured to provide a sensory cue to a user of the second computing device to move the second computing device according to the motion indicated at the first computing device, or to stop moving the second computing device. The sensory cue may be a vibration. An electromechanical device may cause the vibration. Multiple electromechanical devices may cause the vibration. At least two electromechanical devices may vibrate the second computing device at two opposing edges or corners of the second computing device. When multiple electromechanical devices vibrate, the second computing device may vibrate with a greater magnitude than if a single electromechanical vibration device is employed. The system may comprise a component configured to negotiate with the first computing device a selection of a video codec and/or an audio codec.

In various embodiments, the technology provides a method performed by a computing system, comprising: receiving location information from a second computing device; storing the location information received from the second computing device; receiving location information from a third computing device; storing the location information received from the third computing device; receiving a request from a first computing device for an audio feed and/or a video feed from a specified location; determining that the second computing device is proximate to the specified location; and indicating the second computing device to the first computing device so that the second computing device can transmit audio and/or video to the first computing device. The method may comprise determining that the third computing device is also proximate to the specified location; and selecting the second computing device. The method may comprise offering a tender (e.g., a bid or offer) from the first computing device to the second and the third computing devices; and receiving an acceptance from the second computing device. The method may comprise determining capabilities of the first, the second, and the third computing devices, and selecting the second computing device because it matches the capabilities of the first computing device more closely.

Turning now to the figures, FIG. 1 is a block diagram illustrating an environment 100 in which the disclosed technology may operate in various embodiments. The environment 100 includes a client computing device 102 and supplier computing devices 104, 106, and 108. A first supplier computing device 104 is capable of capturing a first scene 110 because it is proximate to the first scene 110. A second supplier computing device 106 is capable of capturing a second scene 112 because it is proximate to the second scene 112. A third supplier computing device 108 is capable of capturing a third scene 114 because it is proximate to the third scene 114. Each scene can include one or more objects. As one example, the first scene 110 includes two objects.

Figure 2:
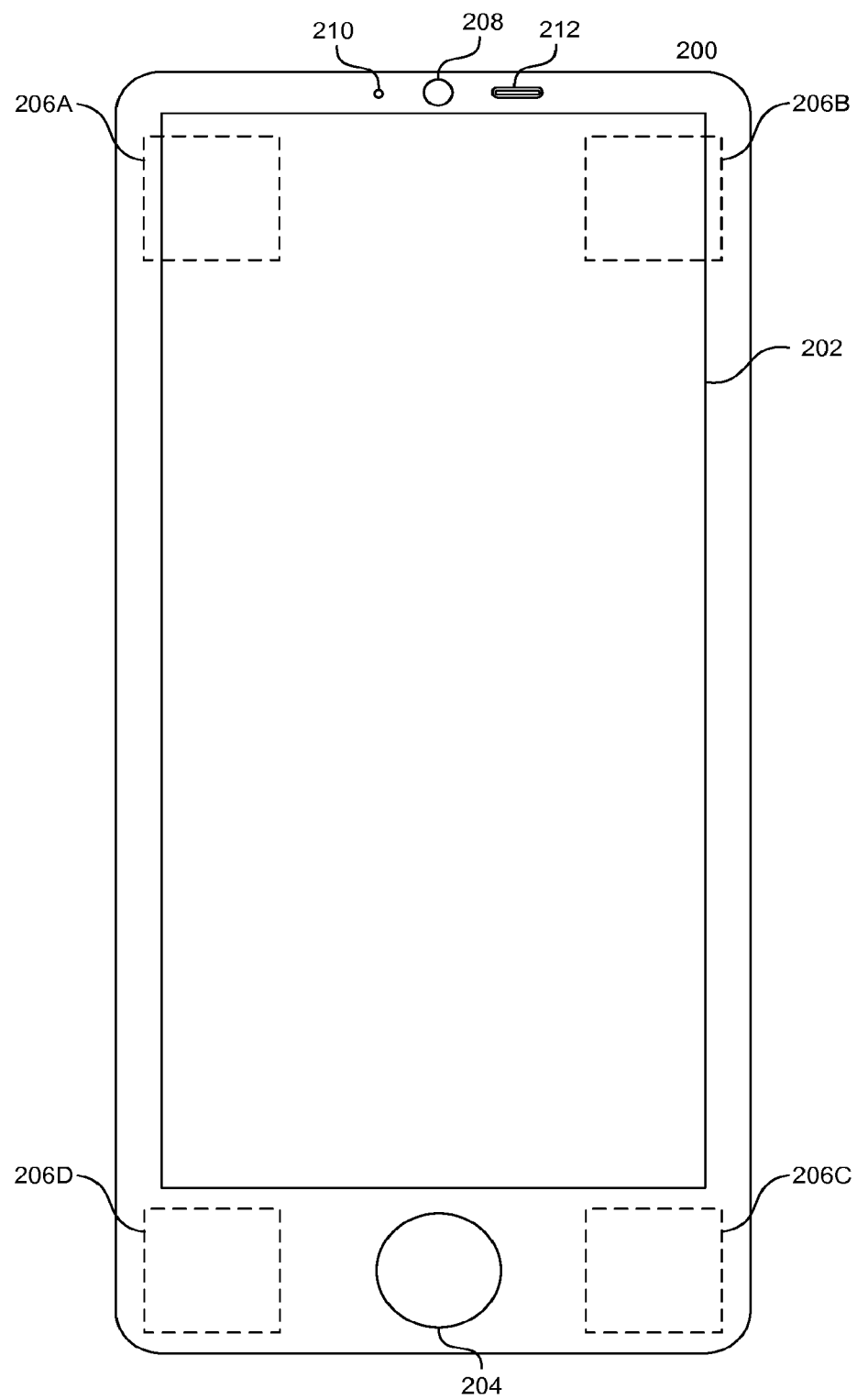
FIG. 2 is a front view illustration of a mobile computing device employed by the disclosed technology in some embodiments.

FIG. 2 is a front view illustration of a mobile computing device 200 employed by the disclosed technology in some embodiments. The mobile computing device 200 includes a touchscreen 202 on which information can be displayed and from which user input can be received. The mobile computing device 200 also includes a button 204 via which user input can be received. The mobile computing device 200 can include one or more vibration units 206A, 206B, 206C, and 206D for causing vibrations or other tactile indications. The illustrated mobile computing device 200 also includes a camera 208, a microphone 210, and a speaker 212. The camera 208 can capture still or video images. The microphone ("mic") 210 can capture audio. The speaker 212 can produce sounds or generate other audible signals. The mobile computing device 200 can also include an audio jack (not illustrated) so that a user can substitute an earphone or a headset for the speaker 212. In various embodiments, the mobile computing device can include a media controller (not illustrated) that is capable of detecting and/or recording media (e.g., images, video, audio, etc.) for transmission to a different computing device. In various embodiments, the media controller may be capable of playing back or rendering media received from a different computing device.

Figure 3:
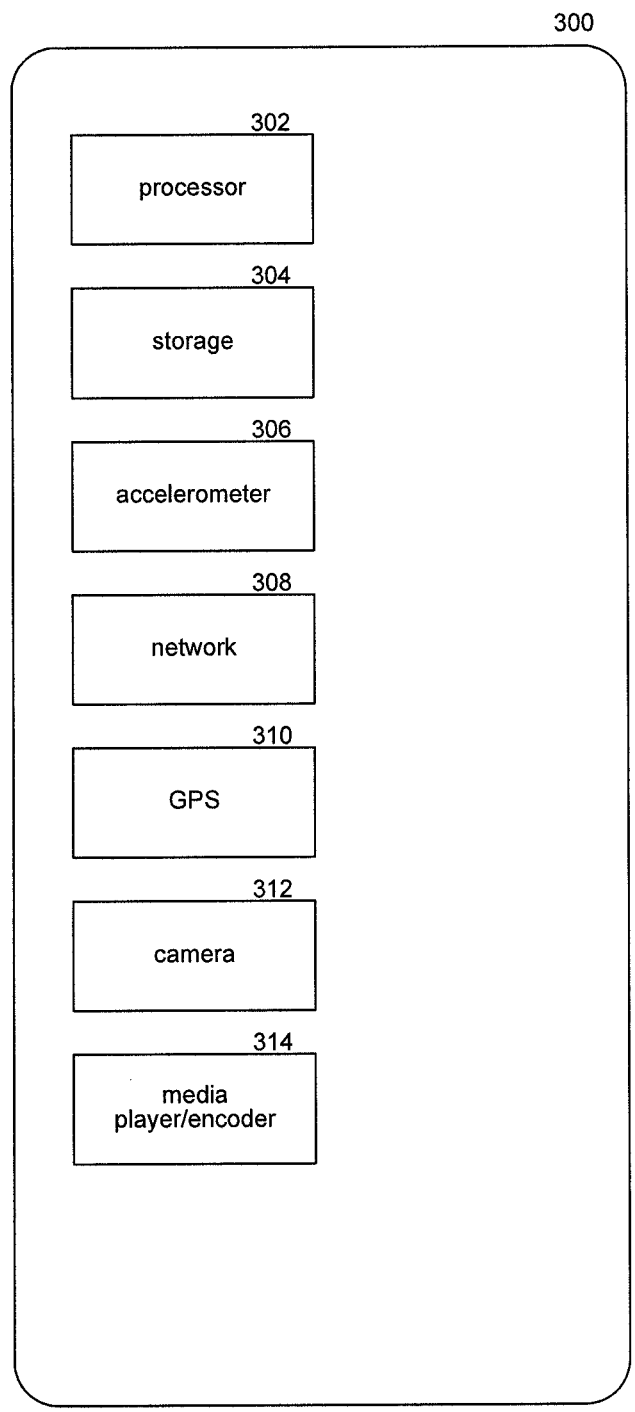
FIG. 3 is a block diagram illustrating components of a mobile computing device employed by the disclosed technology in various embodiments.

FIG. 3 is a block diagram illustrating components of a mobile computing device 300 employed by the disclosed technology in various embodiments. The illustrated components include a processor 302, a storage 304, an accelerometer 306 (or other inertial sensor), a network interface 308, a global positioning system unit 310, a camera 312, and a media player/encoder component 314. The storage 304 can include memory (or "primary") and secondary storage. The accelerometer 306 can measure movement of the mobile computing device 300, e.g., on two, three, or more axes. In various embodiments, other sensors can be used instead of or in addition to the accelerometer 306. The network interface 308 can be used to you communicate with voice or data networks. The global positioning system (GPS) unit 310 can detect the geographical position of the mobile computing device 300, e.g., in reference to a network of satellites. In various embodiments, other components can be used to instead of or in addition to the GPS unit 310, e.g., to detect geographical position of the mobile computing device 300 accurately. The media player/encoder components 314 can be used to playback received data feeds or encode captured audio or visual data. In various embodiments, the mobile computing device 300 may include only a media player or a media encoder, but not both.

Figure 4:
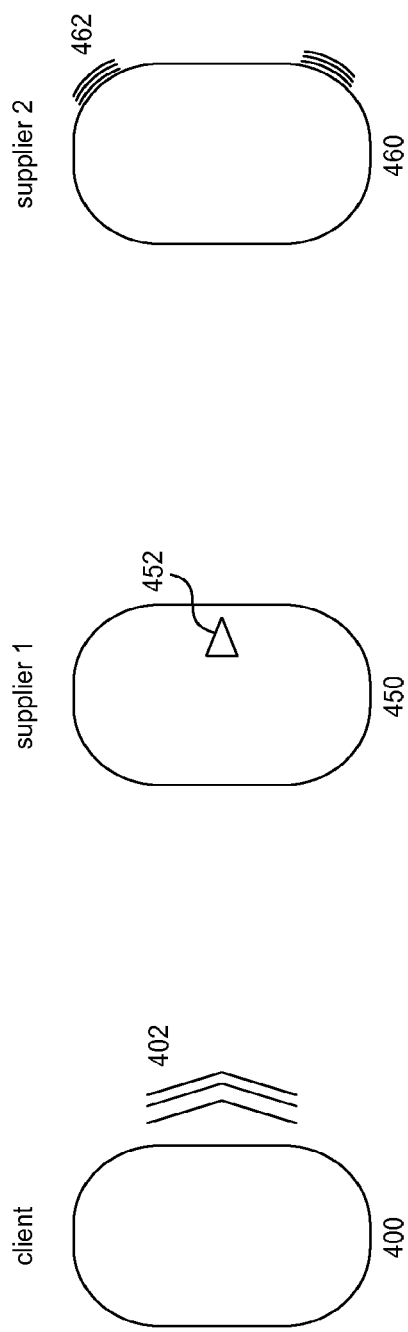
FIG. 4 is a block diagram illustrating aspects of a user interface employed by the disclosed technology in various embodiments.

FIG. 4 is a block diagram illustrating aspects of a user interface employed by the disclosed technology in various embodiments. When a supplier's computing device is presently capturing a portion of a scene (e.g., the tree in the first scene 110) but the client desires to see a different portion of the scene (e.g., the house in the first scene 110), the client can move or pan the client's computing device. If a client moves a client computing device 400 to the right 402, software executing at the client computing device transmits indications of the movement to a first supplier computing device 450 and/or a second supplier computing device 460. The first supplier computing device 450 can visually indicate to its user (e.g., a supplier) to move the first supplier computing device 450 to the right, e.g., by displaying an icon 452 pointing to the right. In various embodiments, other visual indications may be provided, e.g., a ball bouncing against a frame, a thin frame around the display with colors indicating direction of movement, etc. Had the client moved the client computing device 400 to the left, the first supplier computing device may instead have displayed an icon pointing to the left. The second supplier computing device 460 activates one or more vibration units 462 (or other tactile output devices) to tactilely indicate to its user to either move the second supplier computing device 460 to the right or to stop moving the second supplier computing device, e.g., because the client has stopped moving the client computing device 400. In various embodiments, when the client moves the client computing device 400, a supplier computing device may initially display an icon to request the supplier to begin moving the supplier computing device and then may activate a vibration unit to indicate to stop movement. In various embodiments, combinations of visual, audible, and/or tactile inputs may be provided to the supplier. As one example of audible input, a supplier computing device can generate sounds on the right side of a stereo sound system to request a panning motion to the right.

Figure 5:
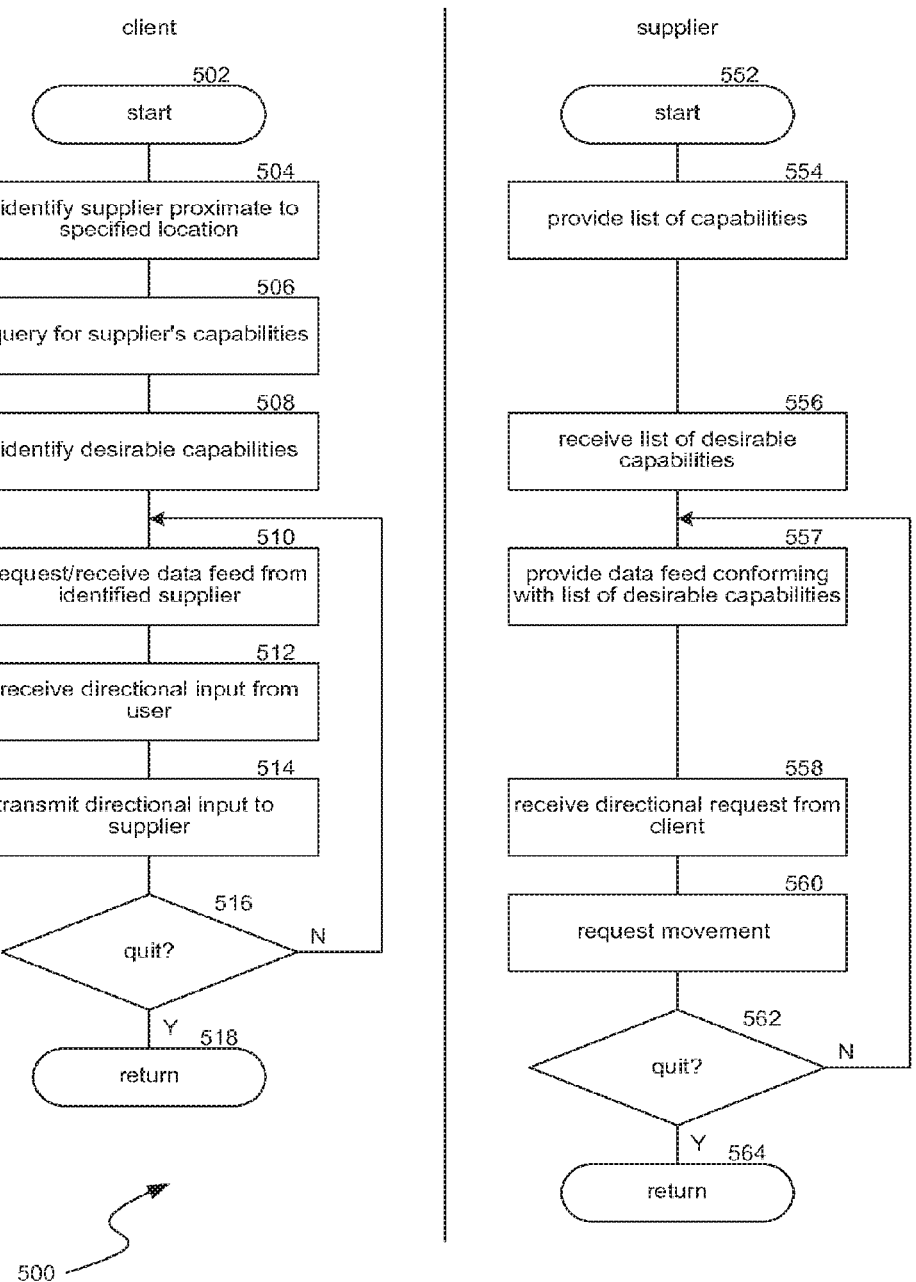
FIG. 5 is a flow diagram illustrating routines invoked by a client computing device and a server computing device in various embodiments.

FIG. 5 is a flow diagram illustrating routines 500 invoked by a client computing device and a server computing device in various embodiments. A routine invoked by a client computing device to identify supplier computing devices, negotiate capabilities with the identified supplier computing devices, and receive data feeds from the supplier computing devices begins at block 502. The routine then continues at block 504. At block 504, the routine requests identification of one or more suppliers proximate to a specified location. As one example, a client can indicate that the client is interested in receiving data feeds from a particular location at which the client knows a newsworthy event is occurring. The request may be transmitted to a server computing device and the server computing device may respond with a list of candidate computing devices. The routine then continues at block 506, where the routine queries for the capabilities of one or more of the listed candidate supplier computing devices. In various embodiments, the client computing device can transmit the request to the server computing device or to each of the listed candidate supplier computing devices. The routine then continues at block 508, where the routine identifies desirable capabilities. As one example, the routine may identify as desirable capabilities a media format, bandwidth, minimum acceptable resolution, etc. In various embodiments, the identified desirable capabilities may be transmitted to the server computing device or directly to selected supplier computing devices. The routine then continues at block 510, where it requests and/or receives data feeds, e.g., streaming audio/video from identified suppliers. The routine then continues at block 512, where it receives directional input from a user of the client computing device. As one example, the routine may detect that the client is panning the client computing device. The routine then continues at block 514, where the routine transmits an indication of the directional input to one or more supplier computing devices. In various embodiments, the routine may detect the client's operation of a camera, microphone, or other input devices pertaining to the client computing device and transmit indications of that input to one or more supplier computing devices. The routine then continues at decision block 516, where it determines whether the client has indicated to terminate receiving data feeds. If the client has indicated to terminate receiving data feeds, the routine returns at block 518. Otherwise, the routine continues at block 510.

A corresponding routine invoked by a server computing device begins at block 552. The routine continues at block 554, where it provides a list of capabilities. As one example, a supplier computing device can provide a list of capabilities when it registers with a server computing device. Alternatively, the supplier computing device may be queried for its capabilities, e.g., when a client desires to identify supplier computing devices that provide desirable capabilities. The routine continues at block 556, where it receives a list of desired capabilities. As one example, the supplier computing device may be compatible with various capabilities, but may provide capabilities suitable for consumption or desirable by the client computing device with which the supplier computing device is connecting to provide a data feed. The routine continues at block 557, where it provides a data feed conforming with one or more of the listed desirable capabilities. As one example, the routine may provide a data feed comprising a streaming video at a specified minimum or maximum resolution. The routine then continues at block 558, where it receives a directional request from the client computing device. As one example, the routine may receive an indication that the client computing device is panning or moving to the right. The routine then continues at block 560, where it requests the supplier (e.g., the user of the supplier computing device) to make the indicated movement. As examples, the routine may provide visual, audible, and/or tactile cues to begin, continue, or stop movement. The routine then continues at decision block 562, where it receives an indication to terminate providing the data feed. In various embodiments, the indication may be received from either the client or the supplier. If the routine receives an indication to terminate providing the data feed, the routine returns at block 564. Otherwise, the routine continues at block 557.

Those skilled in the art will appreciate that the logic illustrated in FIG. 5 and described above, and in each of the flow diagrams discussed below, may be altered in various ways. For example, the order of the logic may be rearranged, operations may be performed in parallel, illustrated logic may be omitted, other logic may be included, etc.

Figure 6:
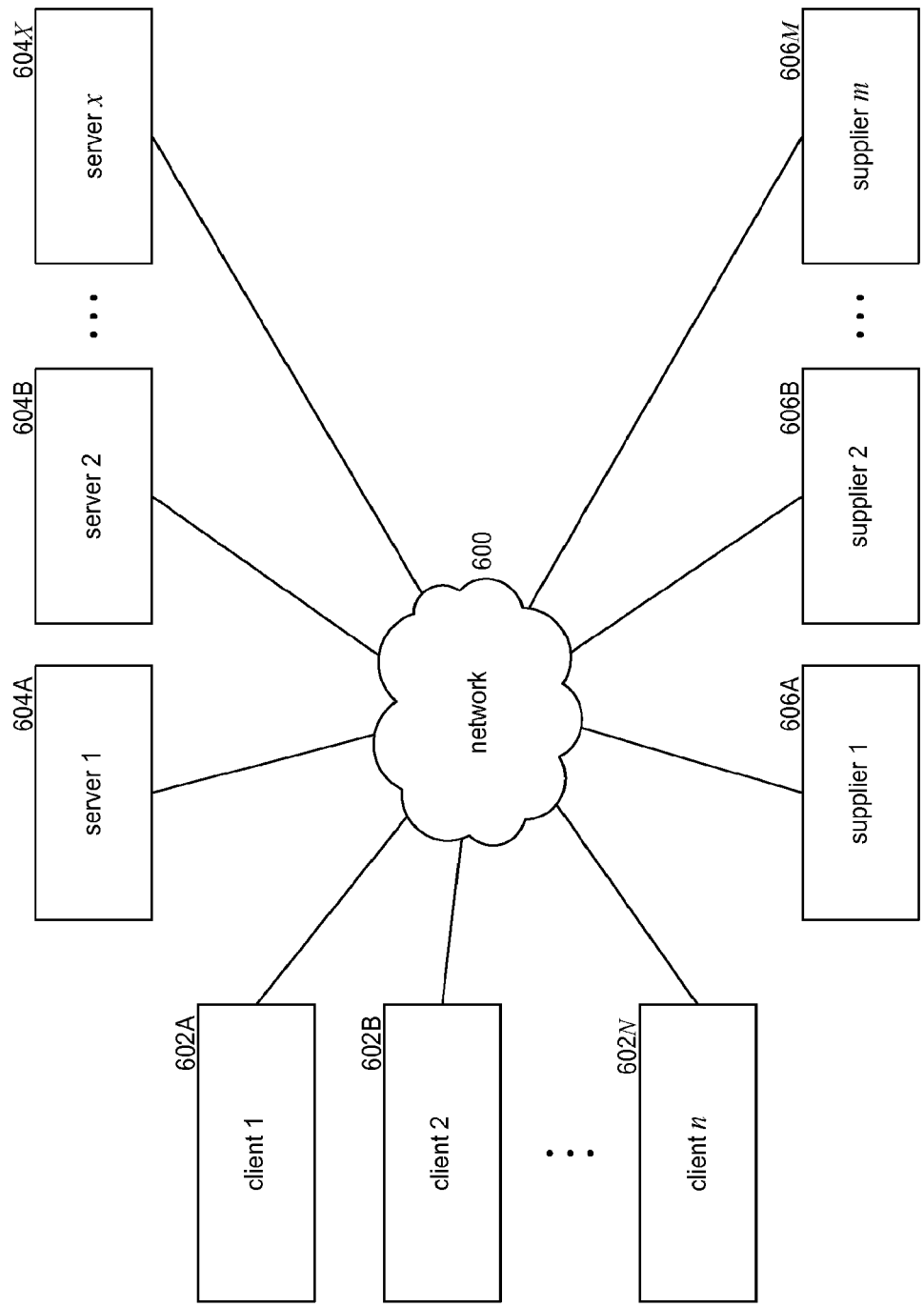
FIG. 6 is a block diagram illustrating components employed by the disclosed technology in various embodiments.

FIG. 6 is a block diagram illustrating components employed by the disclosed technology in various embodiments. The components can include one or more client computing devices (e.g., client computing devices 602A, 602B, and 602N), that each are connected via a network 600 to each other and to server computing devices 604A, 604B, and 604X. The client and server computing devices are also connected via the network 600 to each other and to supplier computing devices 606A, 606B, and 606M. A client computing device can be a mobile computing device or any other type of computing device, and can maintain concurrent connections with multiple supplier computing devices. A client can be, e.g., a news organization, an emergency or other government entity, or indeed any person or other entity. By employing client computing devices 602A-602N, the clients can take advantage of widely scattered and numerous supplier computing devices 606A, 606B, and 606M, e.g., to remotely observe current events in real time.

In various embodiments, a first supplier computing device may act as a relay for a second supplier computing device. As one example, a second computing device may not be capable of receiving a cellular phone signal, but may be able to communicate (e.g., using 802.11 or "wifi"). In such a case, the first supplier computing device may exchange data with the second supplier computing device using an available communications means (e.g., wifi) and exchange data with a client communications device using, e.g., cellular networks.

Figure 7:
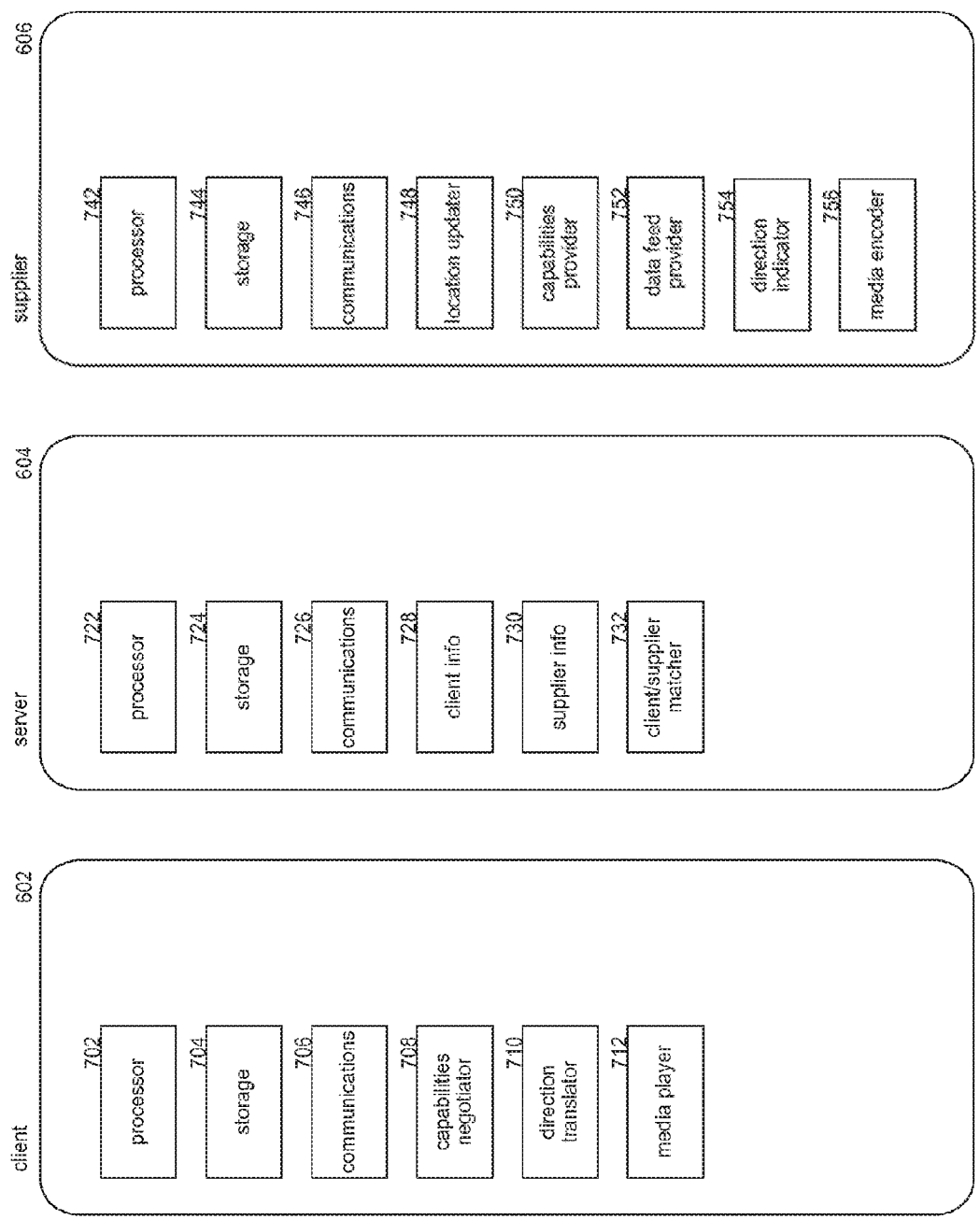
FIG. 7 is a block diagram illustrating components employed by the disclosed technology in various embodiments.

FIG. 7 is a block diagram illustrating components employed by the disclosed technology in various embodiments. A client computing device 602 includes a processor 702, storage 704, communications component 706, capabilities negotiator component 708, direction translator component 710, and media player component 712. The capabilities negotiator component 708 negotiates capabilities with a server computing device and/or a supplier computing device. As one example, the capabilities negotiator component may request a minimum resolution or bandwidth. The direction translator component 710 translates movement a client makes to a client computing device, e.g., to transmit an indicated direction to a supplier computing device. The media player component 712 can play or "render" received data feeds, e.g., streaming audio/video.

A server computing device 604 includes a processor 722, storage 724, communications component 726, client information 728, supplier information 730, and a client/supplier matcher component 732. Client information 728 can include information about clients or client computing devices, e.g., capabilities, acceptable tariffs, etc. Supplier information 730 can include information about suppliers or supplier computing devices, e.g., present location, capabilities, acceptable tariffs, etc.

A supplier computing device 606 includes a processor 742, storage 744, communications component 746, location updater component 748, capabilities provider component 750, data feed provider component 752, direction indicator component 754, and media encoder component 756. The location updater component 748 can provide updated location information to the server computing device 604 so that when a client computing device requests a supplier computing device at a particular location, the server can identify nearby supplier computing devices. The capabilities provider component 750 can indicate capabilities of the supplier computing device 606, e.g., to client computing device 602 or server computing device 604. The data feed provider 752 can provide data to client computing device 602, e.g., streaming audio/video. The direction indicator component 754 can receive indications of directions, e.g., from client computing device 602, and provide indications to a user of the supplier computing device (e.g., supplier) visually, audibly, and/or tactilely. The media encoder component 756 can encode media, e.g., received from cameras, microphones, etc. for transmission to client computing devices via data feed provider 752.

Storage 704, 724, and 744 can include primary and/or secondary storage. Communications components 706, 726, and 746 can enable communications with data and/or voice networks.

Figure 8:
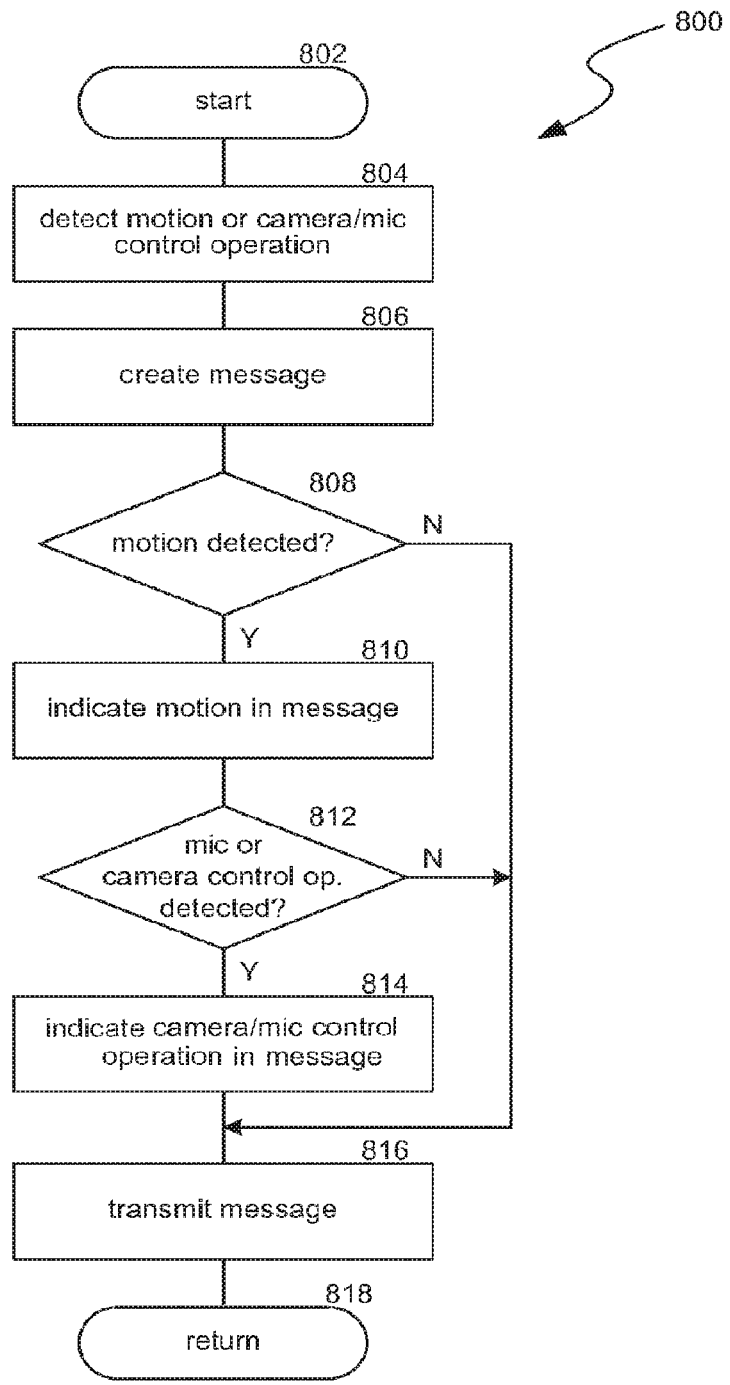
FIG. 8 is a flow diagram illustrating a routine invoked by the disclosed technology in various embodiments.

FIG. 8 is a flow diagram illustrating a routine 800 invoked by the disclosed technology in various embodiments, e.g., to indicate movement made to a client computing device. The routine 800 begins at block 802 and continues at block 804, where it detects motion, camera control operations, microphone control operations, or other input that can be indicated to supplier computing devices. The routine 800 then continues at block 806, where it creates a message. The routine 800 then continues at decision block 808, where it determines whether motion was detected. If motion is detected, the routine 800 continues at block 810. Otherwise, the routine 800 continues at block 816. At block 810, the routine 800 indicates the detected motion in the created message. As one example, the routine 800 may indicate the direction of movement, the speed of movement, the amount of movement, etc. The routine 800 then continues at decision block 812. At decision block 812, the routine 800 determines whether microphone or camera control operations are detected. If the routine 800 determines that microphone or camera control operations are detected, the routine 800 continues at block the routine 800 indicates the detected camera or microphone controller operations 814. Otherwise, the routine 800 continues at block 816. At block 814, the routine 800 indicates the detected camera or microphone control operations in the created message. The routine 800 then continues at block 816, where it transmits the created and/or modified message. The routine 800 then returns at block 818.

Figure 9:
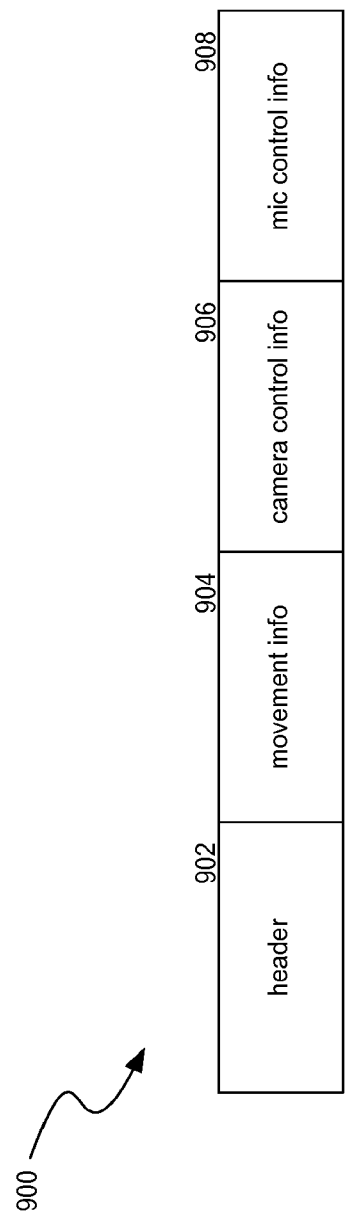
FIG. 9 is a block diagram illustrating portions of a message exchanged by the disclosed technology in various embodiments.

FIG. 9 is a block diagram illustrating portions of a message 900 exchanged by the disclosed technology in various embodiments. The message 900 includes a header section 902, movement information 904, camera control information 906, and microphone control information 908. Examples of camera control information are zoom, on, off, resolution, aperture, shutter speed, exposure control, etc. examples of microphone control information are on, off, gain, volume, etc. In various embodiments, the message 900 can exclude some of the illustrated information segments or include more information segments. Examples of movement information are direction of motion, speed of motion, amount of motion, rotation, etc.

Figure 10:
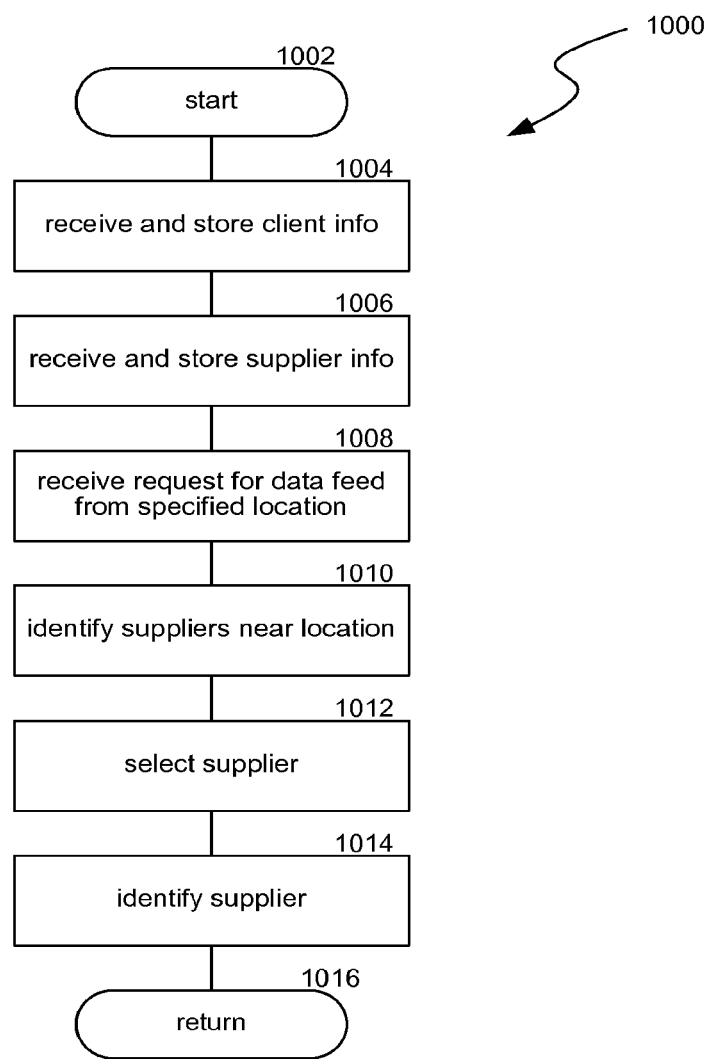
FIG. 10 is a flow diagram illustrating a routine invoked by the disclosed technology in various embodiments.

FIG. 10 is a flow diagram illustrating a routine 1000 invoked by the disclosed technology in various embodiments. The routine 1000 may be invoked by a server computing device to receive and store information pertaining to client and supplier computing devices. The routine 1000 begins at block 1002 and continues at block 1004, where it receives and stores client information. The routine continues at block 1006, where it receives and stores supplier information. The routine continues at block 1008, where it receives a request for a data feed from a specified location, e.g., from a client computing device. The routine continues at block 1010, where it identifies suppliers near the specified location. The routine continues at block 1012, where it selects one or more suppliers. The routine then continues at block 1014, where it identifies the selected suppliers, e.g., to the client computing device from which the request was received. The routine then returns at block 1016.

Figure 11:
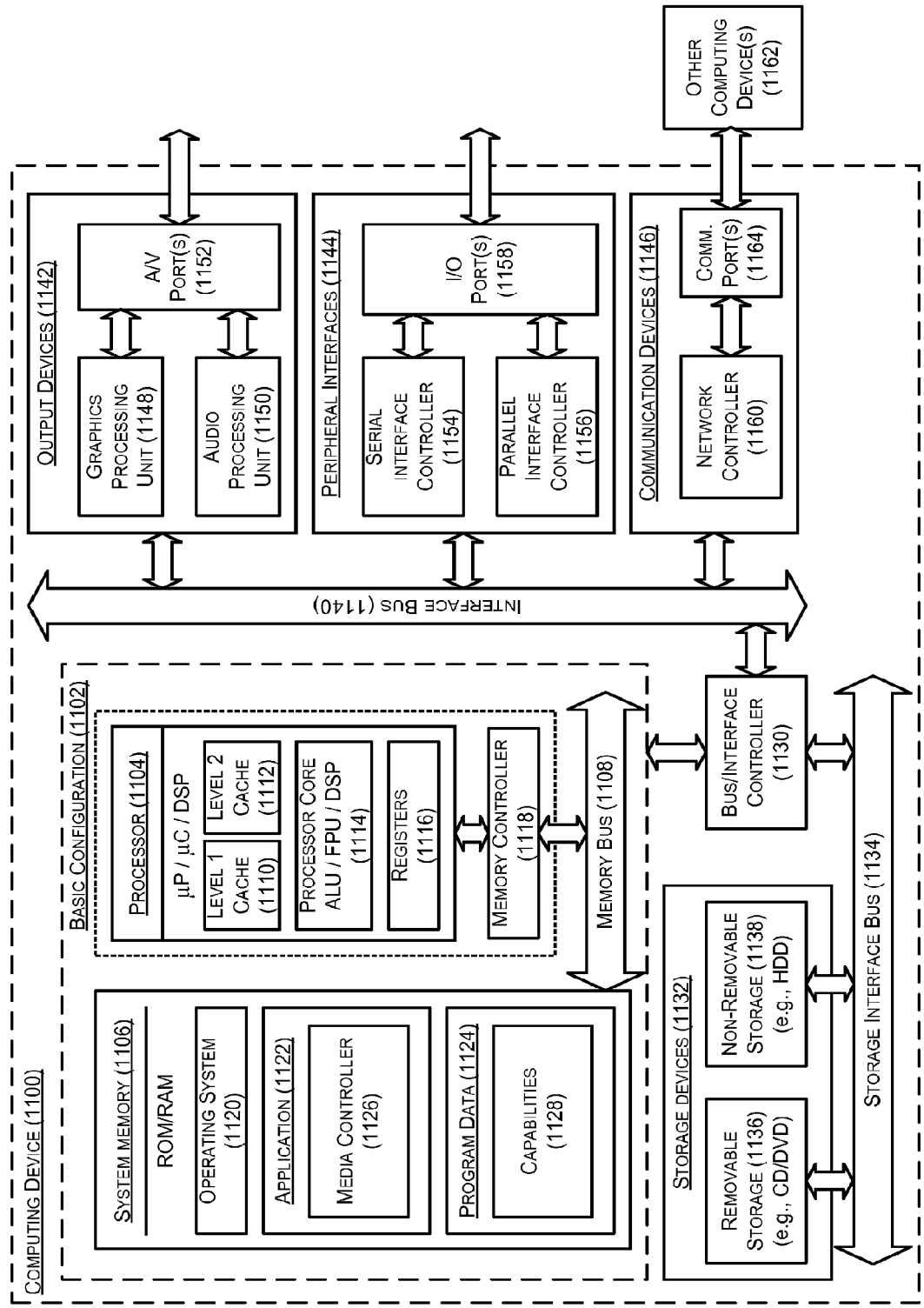
FIG. 11 is a block diagram of an illustrative embodiment of a computing device that is arranged in accordance with at least some embodiments of the present disclosure.

FIG. 11 is a block diagram illustrating one non-limiting example computing device 1100 that is arranged in accordance with at least some embodiments of the present disclosure. In a very basic configuration 1102, computing device 1100 typically includes one or more processors 1104 and a system memory 1106. A memory bus 1108 may be used for communicating between processor 1104 and system memory 1106.

Depending on the desired configuration, processor 1104 may be of any type including but not limited to a microprocessor ("μP"), a microcontroller ("μC"), a digital signal processor ("DSP"), or any combination thereof. Processor 1104 may include one more levels of caching, such as a level one cache 1110 and a level two cache 1112, a processor core 1114, and registers 1116. One example processor core 1114 may include an arithmetic logic unit ("ALU"), a floating point unit ("FPU"), a digital signal processing core ("DSP Core"), or any combination thereof. One example memory controller 1118 may also be used with processor 1104, or in some implementations memory controller 1118 may be an internal part of processor 1104.

Depending on the desired configuration, system memory 1106 may be of any type including but not limited to volatile memory (such as RAM), non-volatile memory (such as ROM, flash memory, etc.) or any combination thereof. System memory 1106 may include an operating system 1120, one or more applications 1122, and program data 1124. Application 1122 may include a media controller 1126 that is arranged to encode and/or decode media. Program data 1124 may include a list of capabilities 1128, as is described herein. In some embodiments, application 1122 may be arranged to operate with program data 1124 on operating system 1120, e.g., to select and employ action modules. This described basic configuration 1102 is illustrated in FIG. 11 by those components within the inner dashed line.

Computing device 1100 may have additional features or functionality, and additional interfaces to facilitate communications between basic configuration 1102 and any required devices and interfaces. For example, a bus/interface controller 1130 may be used to facilitate communications between basic configuration 1102 and one or more data storage devices 1132 via a storage interface bus 1134. Data storage devices 1132 may be removable storage devices 1136, non-removable storage devices 1138, or a combination thereof. Examples of removable storage and non-removable storage devices include magnetic disk devices such as flexible disk drives and hard-disk drives ("HDD"), optical disk drives such as compact disk ("CD") drives or digital versatile disk ("DVD") drives, solid state drives ("SSD"), and tape drives to name a few. Example computer storage media may include volatile and nonvolatile, removable and non-removable media implemented in any method or technology for storage of information, such as computer readable instructions, data structures, program modules, or other data.

System memory 1106, removable storage devices 1136 and non-removable storage devices 1138 are examples of computer storage media. Computer storage media includes, but is not limited to, RAM, ROM, EEPROM, flash memory or other memory technology, CD-ROM, digital versatile disks DVD or other optical storage, magnetic cassettes, magnetic tape, magnetic disk storage or other magnetic storage devices, or any other medium which may be used to store the desired information and which may be accessed by computing device 1100. Any such computer storage media may be part of computing device 1100.

Computing device 1100 may also include an interface bus 1140 for facilitating communication from various interface devices (e.g., output devices 1142, peripheral interfaces 1144, and communication devices 1146) to basic configuration 1102 via bus/interface controller 1130. Example output devices 1142 include a graphics processing unit 1148 and an audio processing unit 1150, which may be configured to communicate to various external devices such as a display or speakers via one or more A/V ports 1152. Example peripheral interfaces 1144 include a serial interface controller 1154 or a parallel interface controller 1156, which may be configured to communicate with external devices such as input devices (e.g., keyboard, mouse, pen, voice input device, touch input device, etc.) or other peripheral devices (e.g., printer, scanner, etc.) via one or more I/O ports 1158. One example communication device 1146 includes a network controller 1160, which may be arranged to facilitate communications with one or more other computing devices 1162 over a network communication link via one or more communication ports 1164.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency ("RF"), microwave, infrared ("IR") and other wireless media. The term computer readable media as used herein may include both storage media and communication media. The term computer readable storage media as used herein does not include communication media.

Computing device 1100 may be implemented as a portion of a small-form factor portable (or mobile) electronic device such as a cell phone, a personal data assistant ("PDA"), a personal media player device, a wireless web-watch device, a personal headset device, an application specific device, or a hybrid device that include any of the above functions. Computing device 1100 may also be implemented as a personal computer including both laptop computer and non-laptop computer configurations.

In an illustrative embodiment, any of the operations, processes, etc. described herein can be implemented as computer-readable instructions stored on a computer-readable medium. The computer-readable instructions can be executed by a processor of a mobile unit, a network element, and/or any other computing device.

There is little distinction left between hardware and software implementations of aspects of systems; the use of hardware or software is generally (but not always, in that in certain contexts the choice between hardware and software can become significant) a design choice representing cost vs. efficiency tradeoffs. There are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein can be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a first computing device, comprising:
   determining whether an input by a client component operating at the first computing device includes a physical motion made to the first computing device corresponding to a requested motion of a second computing device;
   determining whether the input by the client component operating at the first computing device includes a camera control operation relating to a first digital camera associated with the first computing device;
   detecting, at the first computing device, an operation of a first microphone associated with the first computing device;
   creating a message to send to the second computing device, the message including an indication of the determined input;
   modifying the message to include an indication of the operation of the first microphone to the message; and
   transmitting the modified message to the second computing device to cause the second computing device to:
      perform the camera control operation relating to a second digital camera associated with the second computing device in response to the determined input including the camera control operation,
      provide an indication to move the second computing device in a manner consistent with the requested motion in response to the determined input including the physical motion, and
      operate a second microphone associated with the second computing device in a manner consistent with the operation of the first microphone.

2. The method of claim 1, wherein the indication to move the second computing device is provided to a user of the second computing device.

3. The method of claim 1, wherein the camera control operation relating to the first digital camera includes a zoom operation.

4. The method of claim 3, wherein the transmitting the modified message causes the second digital camera to perform an equivalent zoom operation.

5. The method of claim 1, wherein the camera control operation includes a video capture mode.

6. The method of claim 1, wherein the operation of the first microphone is to turn the microphone on or to turn the microphone off.

7. The method of claim 1, further comprising using a sensor associated with the first computing device to detect the physical motion.

8. The method of claim 1, further comprising invoking a function of an application programming interface that provides motion information detected using an accelerometer.

9. The method of claim 1, wherein the transmitting the modified message causes the second computing device to generate an alert using visual, audible, and/or sensory cues to move the second computing device.

10. The method of claim 1, further comprising:
    receiving from the second computing device an indication of an appropriate audio codec or a video codec; and
    selecting at the first computing device one or more codecs corresponding to the indicated audio codec or video codec.

11. The method of claim 1, wherein the detected physical motion made to the first computing device includes detecting a rotation or a tilt.

12. The method of claim 1, further comprising receiving an audio stream and/or a video stream from the second computing device.

13. The method of claim 12, further comprising relaying the received audio stream and/or video stream to a third computing device.

14. A non-transitory computer-readable storage medium storing instructions that, when executed, cause a first computing device including a first microphone to perform a method, comprising:
    receiving, from a second computing device, a message including a determined input and an indication of an operation of a second microphone, wherein the determined input includes an indication of at least one of:
       a physical motion at the second computing device corresponding to a requested motion of the first computing device, and
       a camera control operation made at the second computing device; and
    performing operations of:
       moving the first computing device in response to a determination that the received message includes the indication of the physical motion at the second computing corresponding to the requested motion of the first computing device,
       controlling a digital camera associated with the first computing device in response to a determination that the received message includes the indication of the camera control operation made at the second computing device, and operating the first microphone in a manner consistent with the operation of the second microphone.

15. The non-transitory computer-readable storage medium of claim 14, wherein the indicated requested motion is included in the message in at least one of a visual, audio, or tactile form.

16. The non transitory computer-readable storage medium of claim 15, wherein the indicated requested motion is directed to a user of the first computing device.

17. The non-transitory computer-readable storage medium of claim 14, wherein the method further comprises transmitting, from the first computing device, a message to the second computing device indicating an audio codec and/or a video codec operating at the first computing device.

18. The non-transitory computer-readable storage medium of claim 17, wherein the method further comprises receiving an indication of an audio codec and/or video codec operating at the second computing device that is different from the audio codec and/or a video codec operating at the first computing device.

19. The non-transitory computer-readable storage medium of claim 17, wherein the method further comprises selecting at the first computing device the different audio codec and/or a video codec operating at the second computing device.

20. The non-transitory computer-readable storage medium of claim 14, wherein the method further comprises invoking a function of an application programming interface that enables a digital camera associated with the first computing device to be controlled.

21. The non-transitory computer-readable storage medium of claim 14, wherein the method further comprises invoking a function of an application programming interface that enables a microphone associated with the first computing device to be controlled.

22. The non-transitory computer-readable storage medium of claim 14, wherein the method further comprises transmitting location information indicating a geographic location of the first computing device.

23. The non-transitory computer-readable storage medium of claim 14, wherein the method further comprises transmitting to the second computing device an audio stream using a microphone associated with the first computing device and/or a video stream captured using a digital camera associated with the first computing device.

24. A system, comprising:
a first computing device having one or more processors and memories;
a first component configured to:
determine whether an input includes a physical motion made to the first computing device corresponding to a requested motion made at the first computing device,
determine whether the input includes a camera control operation relating to a first digital camera associated with the first computing device, and
detect an operation of a first microphone associated with the first computing device; and
a second component configured to:
create a message to send to a second computing device, the message including an indication of the determined input,
modify the message to include an indication of the operation of the first microphone to the message, and
transmit the modified message to the second computing device to cause the second computing device to perform:
the camera control operation relating to a second digital camera associated with the second computing device in response to the determined input including the camera control operation,
providing an indication to move the second computing device in a manner consistent with the requested motion in response to the determined input including the physical motion, and
operating a second microphone associated with the second computing device in a manner consistent with the operation of the first microphone.

25. The system of claim 24, wherein the indication of the detected motion is made at least one of visually, audibly, or tactilely.

26. The system of claim 25, wherein the indication is made to a user of the second computing device.

27. The system of claim 24, wherein the sensor is an accelerometer.

28. The system of claim 24, wherein the sensor detects a panning motion.

29. The system of claim 24, wherein the sensor detects a tilting motion.

* * * * *